Dec. 17, 1957  H. V. HESS  2,816,938
FRACTIONAL CRYSTALLIZATION UNDER PRESSURE
Filed June 18, 1954  3 Sheets-Sheet 1

Dec. 17, 1957

H. V. HESS 2,816,938

FRACTIONAL CRYSTALLIZATION UNDER PRESSURE

Filed June 18, 1954

United States Patent Office 2,816,938
Patented Dec. 17, 1957

2,816,938

FRACTIONAL CRYSTALLIZATION UNDER PRESSURE

Howard V. Hess, Glenham, N. Y., assignor to The Texas Company, New York, N. Y., a corporation of Delaware Application June 18, 1954, Serial No. 437,790

6 Claims. (Cl. 260—666)

This invention relates to a method for the separation of solid and liquid mixtures of organic compounds. More particularly, this invention relates to a method of fractionating a mixture of organic compounds by fractional crystallization or melting. This invention is particularly applicable to the separation of liquid mixtures of isomeric compounds by fractional crystallization. The practice of this invention is also applicable to the separation of a liquid mixture of organic compounds wherein these compounds are difficultly separable therefrom by separation processes, such as by fractional distillation, solvent extraction, complex formation, extractive distillation conventional fractional crystallization, and combinations of the above. In a very limited aspect this invention is concerned with the separation of a mixture of two or more isomeric organic compounds, such as isomeric aromatic hydrocarbons and isomeric naphthenic hydrocarbons, particularly the isomeric alkyl-substituted aromatic hydrocarbons, e. g., the separation of para-xylene from its admixture with meta-xylene and/or other isomeric aromatic hydrocarbons such as ortho-xylene and ethylbenzene.

As indicated hereinabove, various methods have been proposed and employed for separating mixtures of organic compounds into their components. In general, however, the methods heretofore available have not been entirely satisfactory for the separation and recovery of the components of many mixtures, particularly mixtures of closely related organic compounds which have similar boiling points and which form eutectic compositions upon being separated by fractional crystallization.

It is an object of this invention to provide an improved method for fractionating a mixture of organic compounds.

It is another object of this invention to provide an improved method of fractionating liquid mixtures of organic compounds by fractional crystallization.

It is another object of this invention to provide an improved method for fractionating a liquid mixture of organic compounds by fractional crystallization wherein the fractional crystallization operation is carried out at a substantially elevated temperature with respect to similar crystallization operations carried out heretofore.

It is still another object of this invention to provide an improved method for the recovery of para-xylene from mixtures thereof with meta-xylene by fractional crystallization whereby the amount of para-xylene theoretically recoverable is increased over conventional fractional crystallization processes.

Still another object of this invention is to provide an improved method for the recovery of para-xylene from admixture with isomeric aromatic hydrocarbons by fractional crystallization.

These and other objects of this invention and how they are accomplished will become more apparent and more fully understood with reference to the accompanying description of the invention and drawing wherein:

Fig. 3 is a graphical illustration of the effect of pressure upon the melting point of para-xylene and meta-xylene.

Figure 1:
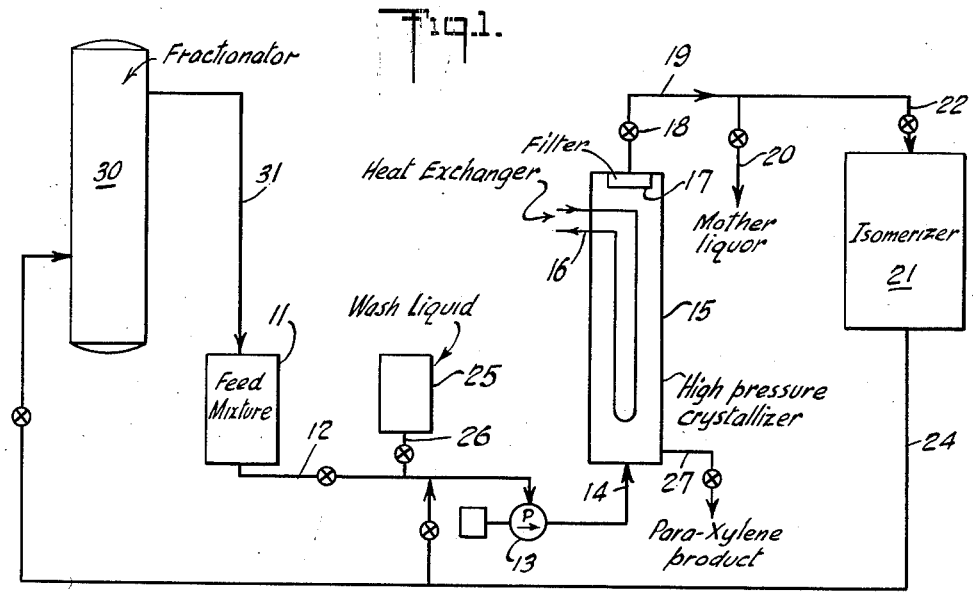
Fig. 1 is a schematic illustration of the process of this invention.

In accordance with my invention it has been discovered that an improved process for the separation and recovery of one or more components of a mixture of organic compounds is obtained by fractional crystallization or melting carried out at an elevated pressure. Stated in other words, it has been discovered in accordance with this invention that an improved fractionation process is obtained by carrying out the fractionation operation at an elevated pressure, e. g., about 5,000 p. s. i. g. and higher. By carrying out the fractional crystallization operation at an elevated pressure the temperature at which fractional crystallization can be effected to separate the components of a mixture of organic compounds is increased with the result that refrigeration requirements are substantially reduced or eliminated.

In a practice of my invention a liquid mixture of organic compounds to be separated is formed. Superatmospheric pressure is then applied to the liquid mixture. After the application of pressure the temperature of the liquid mixture is gradually reduced to effect crystallization of one or more components of the liquid mixture. Following the crystallization of the desired component or components the crystalline material is separated and recovered from the resulting mother liquor. Alternatively, in accordance with the practice of my invention the liquid mixture of organic compounds to be separated is maintained at a suitable temperature $T_1$. Pressure is then applied to the liquid mixture to precipitate or crystallize therefrom one or more of the compounds to be separated. After the desired compound has been crystallized the resulting precipitated or crystalline material is separated and recovered from the resulting liquid mixture still substantially at the temperature $T_1$.

The practice of my invention is broadly applicable to the separation of liquid mixtures of organic compounds, such as aromatic and cyclo-aliphatic organic compounds, particularly mixtures of the normally liquid organic compounds, e. g., compounds which are liquid at atmospheric pressure and at a temperature in the range 40–200° F. Liquid mixtures which are separable by fractional crystallization in accordance with the practice of my invention are: liquid mixtures of alkyl-substituted aromatic hydrocarbons such as mixtures containing the various xylenes, e. g., the ortho-, meta- and para-xylenes and ethylbenzene; liquid mixtures containing the various $C_9H_{12}$ aromatic hydrocarbons such as hemimelitene, pseudocumene, mesitylene, 1-methyl-2-ethylbenzene, 1-methyl-3-ethylbenzene, 1-methyl-4-ethylbenzene, isocumene, cumene; in general, mixtures of alkyl-substituted aromatic hydrocarbons containing eight to twelve carbon atoms per molecule; liquid mixtures of the various isomeric hydroxy-substituted benzene derivatives such as ortho-, meta- and para-cresols, the xylenols such as 2,4 xylenol, 2,5 xylenol, 3,5 xylenol, 2,3 xylenol, 3,4 xylenol, 2,6 xylenol; liquid mixtures of the various isomeric xylidines such as 2,3 dimethylaniline, 3,4 dimethylaniline, 3,5 dimethylaniline, 2,6 dimethylaniline, 2,4 dimethylaniline, 2,5 dimethylaniline; liquid mixtures containing isomeric alpha-substituted and beta-substituted naphthalenes such as alpha-methyl naphthalene and beta-methyl naphthalene; liquid mixtures containing various isomeric and/or close boiling alkanes such as cyclohexane, n-hexane, methyl-cyclopentane, 2,4 dimethyl pentane, 2,2 dimethyl pentane, as well as mixtures of the isomeric heptanes, octanes, nonanes, decanes, etc.; liquid mixtures of other aromatic compounds such as the nuclear-substituted halogen derivatives, nuclear-substituted nitro derivatives, nuclear-substituted amino derivatives of benzene, toluene, naphthalene and the like, particularly liquid mixtures of the ortho-, meta- and para-toluidines, the meta- and para-xylidines, and the isomeric alkyl-substituted derivatives of quinoline and naphthol; liquid mixtures containing the various aromatic acids such as tere-isophthalic acid and para-toluic acid; liquid mixtures of cyclo-aliphatic compounds, e. g., liquid mixtures containing cyclohexanone and the various alkyl-substituted derivatives of cyclohexanone; liquid mixtures containing cyclo-aliphatic alcohols and cyclo-aliphatic ketones such as cyclohexanol and cyclohexanone; liquid mixtures containing isomeric relatively high molecular weight saturated, mono-unsaturated and poly-unsaturated carboxylic acids, including the polycarboxylic acids and the hydroxy-substituted carboxylic acids. The practice of this invention is not limited to the above-enumerated mixtures. These mixtures have been mentioned merely by way of example. In general, the practice of this invention is applicable to the separation of mixtures of organic compounds, particularly hydrocarbons, which are difficultly separable by conventional methods.

The pressure employed in the practice of this invention can be varied to suit the separation conditions desired. A substantial superatmospheric pressure is usually employed, i. e., a pressure of at least about 2000 p. s. i. g. and higher. In general, the higher the temperature at which separation takes place, the higher the pressure required to effect crystallization pressure. Pressures up to and in excess of 200,000 p. s. i. g. may be employed if necessary or desirable. The upper limit of the crystallization pressure employed is usually determined by the operating characteristics of the equipment employed and by the strength of the container containing the mixture to be separated. It is preferred in most instances to apply a pressure in the range 5000–50,000 p. s. i. g. It is realized, of course, that the pressure employed should at least be sufficient to cause precipitation or crystallization of the component of the liquid mixture to be separated. Pressure in substantial excess thereof is unnecessary and may necessitate careful temperature control of the mixture being fractionated to avoid crystallization of an undesired component of the liquid mixture or even complete solidification of the mixture itself.

Usually it is desirable to carry out the high pressure fractional crystallization at a temperature which is obtainable without requiring refrigeration equipment. Preferably the high pressure fractional crystallization of this invention is carried out at a temperature in the range of 0–150° F. Higher or lower temperatures can of course be employed depending upon the component of the mixture to be fractionated.

This invention is particularly suited to the fractional crystallization of liquid mixtures containing para- and meta- xylene for the recovery of para-xylene therefrom. By employing this invention the amount of para-xylene theoretically recoverable before a para-xylene meta-xylene eutectic is formed is significantly increased since it has been determined that in a fractional crystallization operation carried out under high pressure that the para-xylene meta-xylene eutectic became richer in meta-xylene, the component which has a smaller increase in melting point with an increase in pressure, see Fig. 3. This phenomenon is characteristic of such components.

Having described the invention in its broad aspects, it will now be described in greater detail with respect to a preferred embodiment thereof; more particularly, as applied to recovery of para-xylene from a mixture containing para-xylene and meta-xylene.

Referring now to Fig. 1 of the drawing which schematically illustrates a process in accordance with this invention suitable for the recovery of para-xylene from a liquid mixture containing the same, a liquid feed mixture of mixed xylenes having a composition in the range:

| Component: | Volume percent |
|---|---|
| Ortho-xylene | 0–30 |
| Meta-xylene | 5–70 |
| Ethylbenzene | 0–20 |
| Para-xylene | 10–40 |
| Saturated hydrocarbons | 0–30 | is supplied from vessel 11 via conduit 12 to high pressure pump 13 which pumps the feed mixture via conduit 14 into a high pressure crystallizer 15. High pressure crystallizer 15 is maintained completely full of the feed mixture to be separated and preferably is provided with a heat exchanger 16 through which flows a suitable heating or cooling fluid as required in the operation of this invention. Crystallizer 15 is also preferably provided with a liquid-solid separating means such as a filter 17 made of wire mesh. By restricting the flow of the liquid mixture through crystallizer 15, by means of a throttling device, such as a needle valve 18 located in the discharge or outlet conduit 19 of crystallizer 15, the pressure within crystallizer 15 can be maintained at a suitable high value depending upon the characteristics of pump 13. The mother liquor issuing from crystallizer 15 via valve 18 and conduit 19 can be separately recovered therefrom by valved conduit 20 or passed to an isomerization zone 21 via valved conduit 22. The mother liquor entering isomerization zone 21 is subjected to isomerization and the resulting isomerate product can be passed via conduit 24 to the inlet side of high pressure pump 13 or to a fractionator 30 which supplies the feed mixture, such as a mixed xylene fraction to container 11 via conduit 31. Optionally, a container 25 for suitable wash liquid, such as water or aqueous methanol, is connected with the inlet side of high pressure pump 13 via valved conduit 26.

In accordance with the process schematically illustrated by Fig. 1, a para-xylene containing mixed xylene fraction is pumped into crystallizer 15. After the crystallizer has been filled with the liquid mixture to be fractionated, throttling valve 18 is adjusted to maintain the desired operating elevated pressure, e. g., 25,000 p. s. i. g., within the crystallizer. The temperature of the mixture within the crystallizer is maintained at a suitable value, e. g., 0° F., by passing a suitable heat exchange liquid through heat exchanger 16. As the mixed xylene fraction passes through the crystallizer and under the temperature and pressure conditions of operation, para-xylene crystallizes therefrom. The mother liquor having a reduced para-xylene content with respect to the feed mixture passes through throttling valve 18 at a rate adjusted to maintain the desired elevated pressure within the crystallizer 15 and into conduit 19 from which it may be removed via conduit 20 for any desired further treatment. Optionally, the mother liquor may be passed via valved conduit 22 into isomerizing zone 21 where it is contacted with a suitable isomerization catalyst for xylenes, such as a Friedel-Crafts type catalyst, e. g., aluminum chloride plus hydrogen chloride, to form an isomerized xylene mixture having an increased para-xylene content with respect to the mother liquor. The resulting isomerized xylene mixture is optionally recycled via conduit 24 to the inlet side of pump 13 or to fractionator 30.

After a period of time, sufficient solid para-xylene shall have been produced within the crystallizer to substantially fill the same. It is preferred to operate the crystallizer under a substantially constant pressure. When crystallizer 15 is substantially full of para-xylene, the supply of the liquid mixed xylene feed thereto is stopped. If desired, wash liquid from container 25 is then introduced to displace any remaining mother liquor from the crystallizer. The displaced liquid is recovered via conduit 20. The pressure within the crystallizer is then reduced to atmospheric pressure. A suitable heat exchange fluid is then circulated through heat exchanger 16 to liquefy the solid para-xylene within the crystallizer. After the contents of the crystallizer have been liquefied, the resulting liquid product is removed via valved conduit 27. This liquid product removed via conduit 27 will have a substantially increased para-xylene content with respect to the feed mixture. Depending to some extent upon the temperature and pressure conditions employed within crystallizer 15, the resulting liquid product will be substantially pure para-xylene, e. g., up to 95% para-xylene and higher. If desired the product stream from conduit 27 may be introduced into a second high pressure crystallizer and subjected to a second high pressure fractional crystallization operation in order to produce an even more pure para-xylene product. Alternatively, if desired the product stream via conduit 27 may be subjected to a second fractional crystallization, this time at atmospheric pressure. By operating in this manner the refrigeration requirements of conventional fractional crystallization processes are avoided because the feed mixture is now concentrated with respect to para-xylene, thereby permitting a higher crystallization temperature. For example, a mixture of mixed xylenes having a composition indicated hereinabove and after having been subjected to high pressure fractional crystallization, such as at 0° F. and 25,000 p. s. i. g., yields a para-xylene product stream of 90% purity. This product was then subsequently subjected to fractional crystallization at atmospheric pressure and 0° F. to produce a para-xylene product of 96.7% purity. Optionally, depending upon the structure of the crystallizer 15 and the heat exchanger 16, the originally produced solid para-xylene can be removed from the crystallizer as a solid stick or candle provided crystallizer 15 is provided with a suitable discharge opening therefor.

Figure 2:
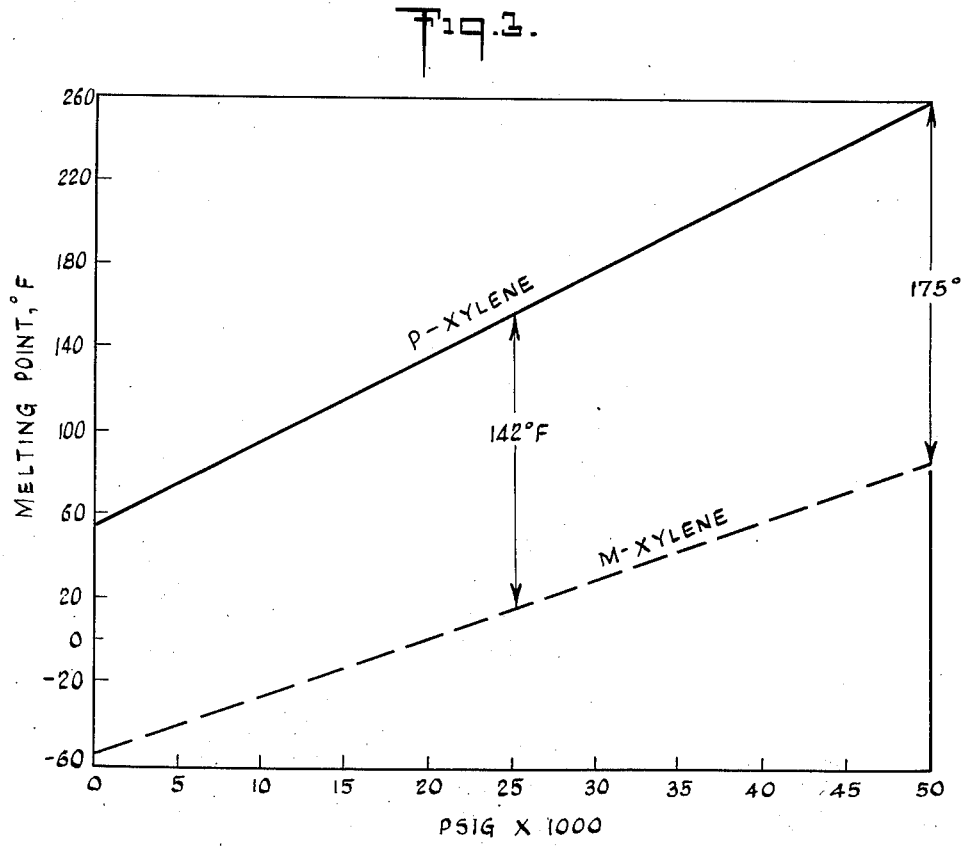
Fig. 2 is a graphical illustration of the influence of pressure upon the melting points of various organic compounds.
Figure 2:
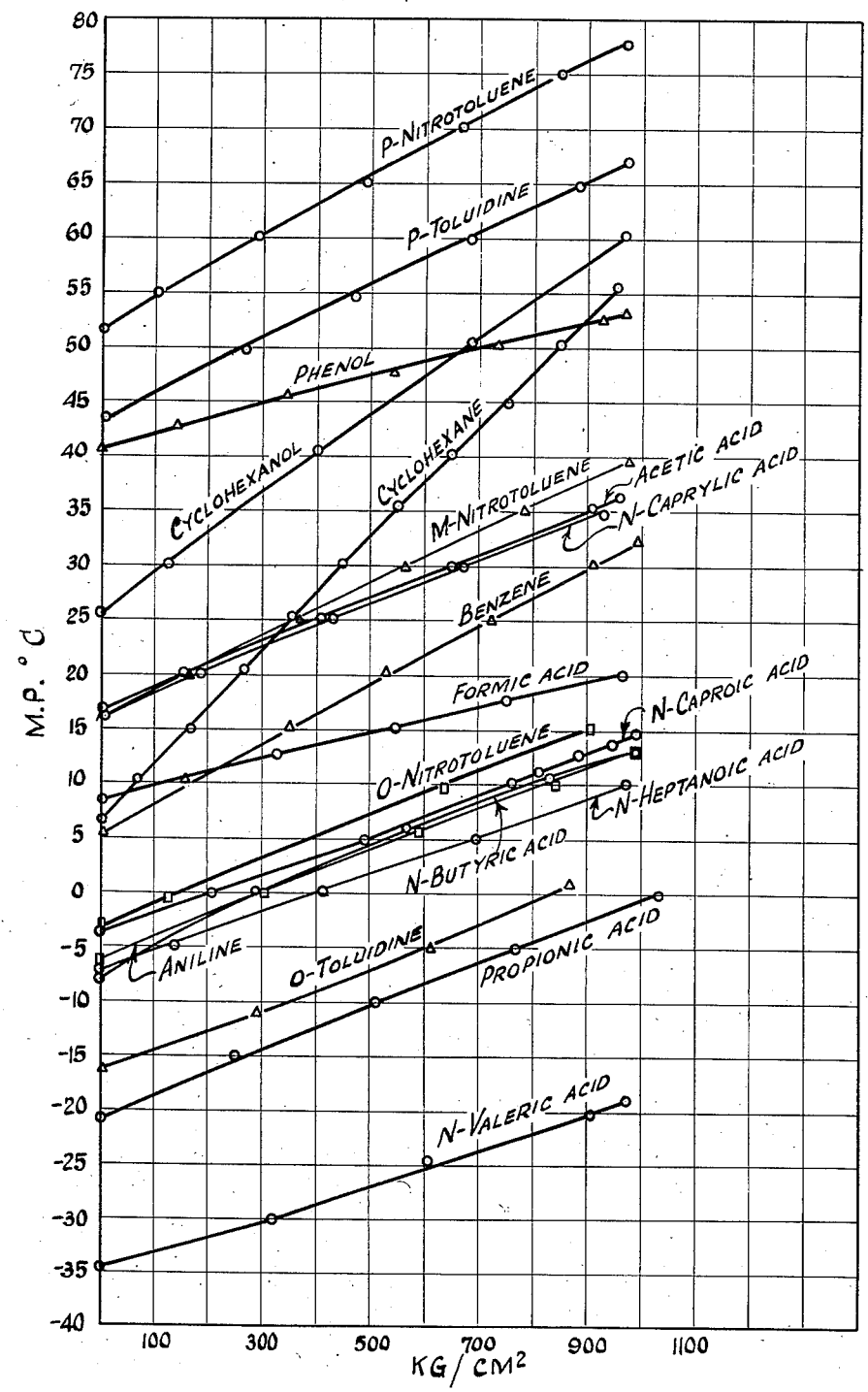

Fig. 2 graphically illustrates the influence of pressure upon the melting points of various compounds which may be separated from mixtures containing the same by the process of this invention.

Fig. 3 graphically illustrates the effect of pressure upon the melting points of para-xylene and meta-xylene. As illustrated, at 25,000 p. s. i. g. the melting point of para-xylene is about 155° F. and the melting point of meta-xylene is about 13° F., and at 50,000 p. s. i. g. the melting point of para-xylene is about 260° F. and the melting point of meta-xylene is about 80° F.

Figure 4:
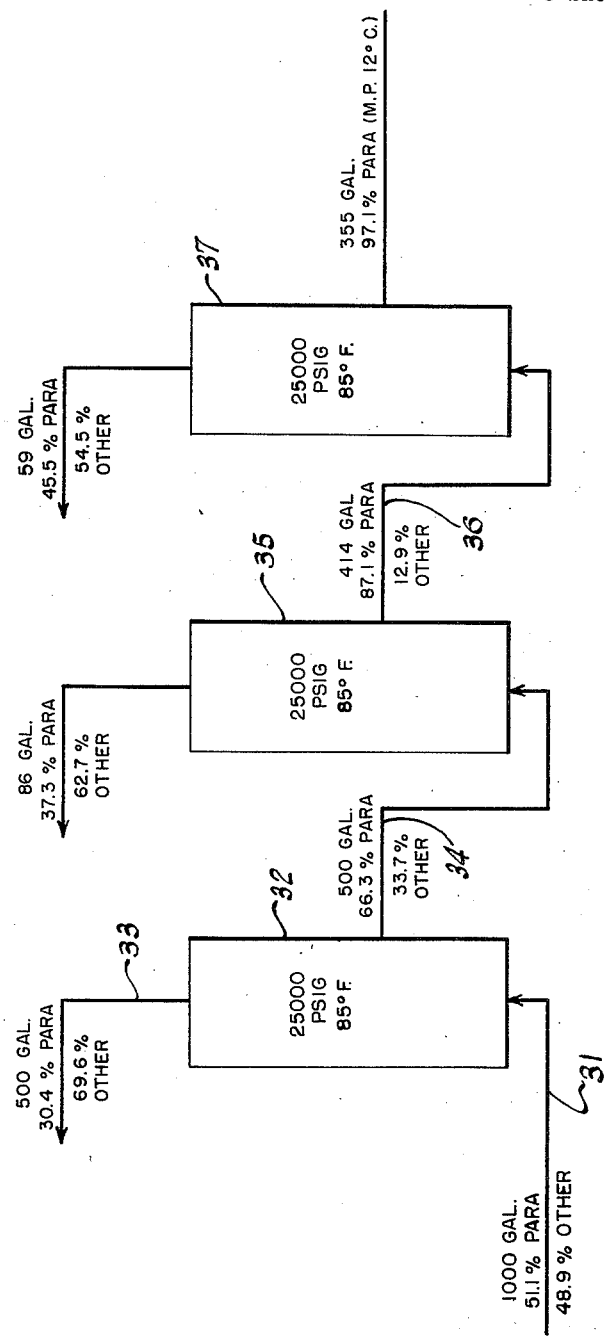
Fig. 4 is a schematic illustration of a process of my invention applied to the recovery and purification of para-xylene.

Fig. 4 schematically illustrates an operation employing the practice of this invention wherein a three-step fractional crystallization operation is carried out to produce substantially pure para-xylene from a mixture initially containing 51.5% para-xylene in admixture with other aromatic hydrocarbons having a similar boiling point e. g., meta-xylene, ortho-xylene, ethyl-benzene. As indicated 1,000 gallons of a mixed xylene fraction is introduced via conduit 31 into high pressure crystallizer 32 which is operated at 25,000 p. s. i. g. and 85° F. Five hundred gallons of a mother liquor containing 30.5% para-xylene is recovered from crystallizer 32 via conduit 33. The remaining 500 gallons having an increased para-xylene content is introduced via conduit 34 into high pressure crystallizer 35 which is also operated at 25,000 p. s. i. g. and 85° F. There is discharged from crystallizer 35 eighty-six gallons of mother liquor containing 37.3% para-xylene. The remainder of the material within crystallizer 37 amounting to 414 gallons and having a para-xylene content of 87.1% is transferred via conduit 36 into high pressure crystallizer 37 which is operated at substantially the same temperature and pressure as crystallizers 32 and 35. There is recovered from crystallizer 37 three hundred fifty-five gallons of substantially pure para-xylene having a purity greater than 97.0%.

Although crystallizers 32, 35 and 37 have been indi-cated as being operated at substantially the same temperature and pressure, it is pointed out that the pressure and temperature within each succeeding crystallizer need not be the same as in the preceding crystallizer. For example, crystallizer 35 may be operated at a substantially greater or lesser temperature and/or pressure than crystallizer 32, and crystallizer 37 may be operated at a substantially greater or lesser temperature and/or pressure than crystallizer 35. Because of the increased para-xylene content of the xylene mixture being separated as it moves from crystallizer 32 to crystallizer 35 to crystallizer 37 the pressure required to effect crystallization of para-xylene at a given temperature is substantially reduced. Accordingly, as the para-xylene content of a high pressure crystallizer feed mixture increases, the operating pressure of the crystallizer can be decreased. However, should the operating temperature of a high pressure crystallizer be increased, the operating pressure of the crystallizer should also be increased in order to effect crystallization of para-xylene from a feed mixture of a given composition.

The following examples are indicative of the practice of this invention:

EXAMPLE I

A mixed xylene fraction containing 26.5% para-xylene and 73.5% other xylenes and ethylbenzene was introduced into a high pressure crystallizer operated at 25,000 p. s. i. g. and 0° F. After continued operation in accordance with this invention, a para-xylene product containing 95.1% para-xylene and 4.9% other xylenes and ethylbenzene was recovered. The results of this operation are set forth in Table No. 1.

Table No. 1

SEPARATION OF P-XYLENE BY FRACTIONAL CRYSTALLIZATION AT 25,000 P. S. I. AND 0° F.

|  | Vol. percent total charge | Vol. percent | |
|---|---|---|---|
|  |  | p-Xylene | Other xylenes and ethyl benzene |
| Charge mixture | | 26.5 | 73.5 |
| Portion pumped through crystallizer | 85.3 | 14.2 | 85.8 |
| Portion recovered by water wash displacement | 1.6 | 15.6 | 84.4 |
| p-Xylene product recovered from crystallizer | 13.1 | 95.1 | 4.9 |

EXAMPLE II

The process of this invention was applied to the separation and recovery of benzene from its admixture with hexanes having a similar boiling point. A liquid mixture containing 28.5% benzene and 71.5% $C_6$ hydrocarbons having a similar boiling point was introduced into a crystallizer operated at 25,000 p. s. i. g. and 0° F. Substantially pure benzene was recovered from the crystallizer. The results of this operation are set forth in Table No. 2.

Table No. 2

SEPARATION OF BENZENE FROM HEXANES BY FRACTIONAL CRYSTALLIZATION AT 25,000 P. S. I. AND 0° F.

|  | Vol. percent | | |
|---|---|---|---|
|  | Yield | Benzene | Hexanes |
| Charge mixture | | 28.5 | 71.5 |
| Portion pumped through crystallizer | 85.9 | 15.8 | 84.2 |
| Portion recovered by water wash displacement | 0.9 | 18.5 | 81.5 |
| Benzene product recovered from crystallizer | 13.2 | 99+ | |

EXAMPLE III

The practice of this invention was also applied to the separation and recovery of cyclohexane from its admixture with other C₆ hydrocarbons having a similar boiling point. A feed mixture containing 85% cyclohexane and 15% hexanes having a similar boiling point was introduced into a crystallizer operated at 30,000 p. s. i. g. and more room temperature about 55° F.). Substantially pure cyclohexane was recovered as product from the crystallizer. Results are set forth in Table No. 3.

Table No. 3

SEPARATION OF CYCLOHEXANE BY FRACTIONAL CRYSTALLIZATION AT 30,000 P. S. I. AND ROOM TEMPERATURE

|  | Vol. percent | |
|---|---|---|
|  | Cyclohexane | Hexanes |
| Charge mixture | 85 | 15 |
| Portion pumped through crystallizer | 81 | 19 |
| Cyclohexane product recovered from crystallizer | 95+ | |

EXAMPLE IV

A mixed xylene fraction containing 25.9% para-xylene, the remainder being isomeric aromatic hydrocarbons, was introduced into a crystallizer operated at 50,000 p. s. i. g. and 48° F. There was recovered substantially pure para-xylene having a purity greater than 98.5%. The results are set forth in Table No. 4.

Table No. 4

SEPARATION OF PARA-XYLENE FROM A MIXED XYLENE FRACTION BY FRACTIONAL CRYSTALLIZATION AT 50,000 P. S. I. G. AND 48° F.

|  | Vol. percent | | | |
|---|---|---|---|---|
|  | Ethylbenzene | Orthoxylene | Metaxylene | Paraxylene |
| Charge mixture | 4.2 | 4.3 | 61.8 | 25.9 |
| Portion pumped through crystallizer | 6.1 | 2.4 | 78.6 | 12.8 |
| Para-xylene product recovered from crystallizer | | | | a 98.6 | a Para-xylene recovery amounted to 59.1% of total para-xylene in charge mixture. Similar runs were carried out at 50,000 p. s. i. g. and temperatures of 5° F., 32° F. and 70° F. Results indicated that increased recovery of para-xylene was possible at lower temperatures.

EXAMPLE NO. V

The process of this invention was applied to the separation and recovery of benzene from its admixture with hexanes having a similar boiling point. A liquid mixture containing 52.4% benzene and 47.6% other C₆ hydrocarbons was introduced into a crystallizer operated at 50,000 p. s. i. g. and 70° F. Substantially pure benzene was recovered from the crystallizer. The results of this operation are set forth in Table No. 5.

Table No. 5

SEPARATION OF BENZENE FROM HEXANES BY FRACTIONAL CRYSTALLIZATION AT 50,000 P. S. I. G. AND 70° F.

|  | Vol. percent benzene |
|---|---|
| Charge mixture | 52.4 |
| Portion pumped through crystallizer (mother liquor) | 23.0 |
| Benzene product recovered from crystallizer | 98.4 |

While this invention has been particularly described with respect to the high pressure fractional crystallization of liquid mixture it is to be emphasized that the broad concept of this invention is applicable to the separation of a solid mixture of compounds, particularly a solid mixture of compounds having substantially the same melting point at atmospheric pressure and difficultly separable by conventional methods but which possess differing melting points when subjected to pressure, e. g. a pressure of 2000 p. s. i. g. and higher.

In the application of the method of this invention to the fractional melting of a solid mixture of organic compounds, the solid mixture to be fractionated is subjected to a suitable pressure, such as in the range 2000–50,000 p. s. i. g. and its temperature gradually adjusted, for example, increased so as to selectively melt that component of the mixture having the lowest melting point at the pressure to which the mixture is subjected.

As will be apparent to those skilled in the art upon reading the foregoing disclosure, many modifications, improvements and alterations are possible without departing from the spirit or scope of this invention.

I claim:

1. A process of fractionating a liquid admixture wherein said liquid admixture is selected from the group consisting of a liquid mixture containing para-xylene and meta-xylene having a composition such that only para-xylene is initially crystallized therefrom, a liquid mixture containing benzene and hexanes having a similar boiling point, said benzene containing liquid mixture having a composition such that only benzene is initially crystallized therefrom and a liquid mixture containing cyclohexane and other C₆ hydrocarbons having a similar boiling point, said cyclohexane containing mixture having a composition such that only cyclohexane is initially crystallized therefrom, which comprises subjecting said liquid admixture to an elevated pressure in excess of 2000 p. s. i. g., adjusting the temperature of said liquid admixture while said admixture is subjected to said pressure to crystallize a component therefrom, and recovering the resulting crystallized component.

2. A process of fractionating a liquid mixture containing benzene and hexanes having a similar boiling point, said liquid mixture having a composition such that only benzene is initially crystallized therefrom, which comprises subjecting said liquid mixture to an elevated pressure in excess of 2000 p. s. i. g., adjusting the temperature of said liquid mixture while said mixture is subjected to said pressure to crystallize benzene therefrom and recovering the resulting crystallized benzene.

3. A process of fractionating a liquid mixture containing cyclohexane and other C₆ hydrocarbons having a similar boiling point, said liquid mixture having a composition such that only cyclohexane is initially crystallized therefrom, which comprises subjecting said liquid mixture to an elevated pressure in excess of 2000 p. s. i. g., adjusting the temperature of said liquid mixture while said mixture is subjected to said pressure to crystallize cyclohexane therefrom and recovering the resulting crystallized cyclohexane.

4. A process for fractionating a liquid mixture having the following composition:

| Component: | Volume Percent |
|---|---|
| Ortho-xylene | 0–30 |
| Meta-xylene | 5–70 |
| Ethylbenzene | 0–20 |
| Para-xylene | 10–40 |
| Saturated hydrocarbons | 0–30 | which comprises subjecting said liquid mixture to an elevated pressure of at least about 2000 p. s. i. g., adjusting the temperature of said mixture to crystallize therefrom at least one of said components and recovering the resulting crystallized material.

5. A process of fractionating a liquid mixture containing para-xylene and meta-xylene said liquid mixture having a composition such that only para-xylene is initially crystallized therefrom, which comprises subjecting said liquid mixture to an elevated pressure in excess of 2000 p. s. i. g., adjusting the temperature of said liquid mixture while said mixture is subjected to said pressure to crystallize para-xylene therefrom and recovering the resulting crystallized para-xylene.

6. A process for fractionating liquid mixture of hydrocarbons containing para-xylene and meta-xylene, said liquid mixture having a composition such that para-xylene is initially crystallized therefrom which comprises subjecting said liquid mixture to superatmospheric pressure in excess of 2000 p. s. i. g., adjusting the temperature of said mixture while said mixture is subjected to said pressure to crystallize therefrom para-xylene and recovering crystallized para-xylene.

References Cited in the file of this patent

UNITED STATES PATENTS

| | | |
|---|---|---|
| 2,435,792 | McArdle et al. | Feb. 10, 1948 |
| 2,651,922 | Graham | Sept. 15, 1953 |
| 2,657,230 | Rogers | Oct. 27, 1953 |
| 2,680,677 | Broge et al. | June 8, 1954 |

OTHER REFERENCES

Bridgeman Physical Reviews, vol. 3, No. 3, pages 153–202 (1914), pages 162, 164, 166, 169, 170, 171, 175, 180 and 183.